METHOD AND DEVICES FOR LOCALIZING FLAT CHIPS ON A CARRIER PLATE

This invention relates to a method of localizing a rigid plate of small dimensions, such as an integrated circuit chip with reference to a carrier plate and also to a rigid plate of small dimensions equipped for its localization on a carrier plate.

Integrated circuits are available on the market as composite bodies consisting of a carrier plate with printed connection conductors and the actual semiconductor platelets on which the integrated circuit structure is provided. The platelet is so affixed to the carrier plate that the input and output connections for the integrated circuit structure are put in contact with the proper connecting conductors, which requires the localization of the platelet (commonly referred to as a "chip") within tolerances that must not exceed a few hundreds of a millimeter. Whereas the carrier plates, consisting for example of ceramic material, can be produced with the necessary accuracy without difficulty, so that their localizing by mechanical means is possible, the same accuracy cannot be reached for the dimensions of the circuit. The circuit chips are obtained by breaking up a sawed-out slice (of an original rod-shaped single crystal of a semiconductor starting material), the slice being broken along score lines to produce a multiplicity of square or rectangular chips. Consequently, irregularities resulting from the breaking up of the slice into chips are present along the edges of the chips. Since the edge of the chip is the only means available for the mechanical localizing of the chips, the number of mislocalized chips, with respect to the carrier plate, found in mass-production of these composite units is relatively high.

It is already known to provide a checking operation after the assembly of the chips on the carrier plate and to disconnect or sever the badly positioned chips. For this inspection operation, according to a known process, an image of the surface of the chip is projected on a highly magnified scale on a screen provided with localizing reference marks. This procedure is, however, time-consuming and uneconomic for mass-production.

It is an object of the present invention to provide a method that enables automatic localizing of the chips within narrow tolerances and to provide chips having features enabling them to be readily localized automatically within narrow tolerances.

SUMMARY OF THE INVENTION

Briefly, a face of the chip parallel to the carrier plate is provided with at least one reference mark in the shape of an optical grating. A laser beam is projected on the desired position of the reference mark and a photoelectric detector is so placed with reference to the source of the laser beam that when the reference mark is in its proper place, a light beam corresponding to one of the secondary maxima of the light pattern produced by the incidence of the laser beam on the grating is picked up by the detector. The detector is constituted so that when such a light beam is detected, a signal is produced by the detector.

The invention is further described by way of illustrative examples with reference to the accompanying drawings, in which:

FIG. 1 is a plan view of a semiconductor circuit chip provided with two reference mark gratings in accordance with the invention;

FIG. 2 is a section through a localizing grating, such as provided on the chip of FIG. 1, on a highly magnified scale;

FIG. 3 is a representation of the light pattern produced by the laser illuminated grating;

FIG. 4 is a diagrammatic representation of an apparatus for carrying out a first illustrative example of a method according to the invention;

FIG. 5 is a plan view of a chip for explaining a second illustrative example of a method according to the invention, and FIG. 6 is a diagrammatic representation of an apparatus for carrying out a second illustrative example of a method according to the invention.

In accordance with the invention, optical gratings are utilized as reference marks which cover certain regions of each chip. These gratings may be referred to as diffraction gratings and in polychromatic light produce spectra, but with monochromatic light, they produce sharper maxima of light in directions depending upon the light wave length and the periodic spacing of the grating.

FIG. 1 shows a square chip 1 of silicon with an integrated circuit structure 2 on its upper surface and at two ends of one side of the square face, a circular localization field, respectively $M_1$ and $M_2$, each having a diameter of about B 0.1 mm. Each field $M_1$, $M_2$ consists of an array of parallel bands 3 of equal width formed in a silicon oxide insulation layer covering the chip. The bands 3 can be provided by etching, in accordance with a known process, into the silicon oxide layer that has a thickness of a few tenths of a micron. Each band is a few microns wide and the periodic spacing p (i.e., the spacing between corresponding edges of successive bands) for the grating is so chosen that a laser beam incident on the grating produces a specific diffraction pattern.

It is to be noted that the respective bands 3 of the two regions $M_1$ and $M_2$ will preferably run parallel to each other and that their direction is oblique with respect to the principal direction of the integrated circuit structure 2 (most of the features commonly running in two mutually perpendicular directions). The direction of the grating lines is preferably at least 10° different from any of the main lineaments of the integrated circuit structure. The incident ray L can be directed either perpendicularly or obliquely with reference to the plane of the face of the chip 1. It must, however, be contained in a plane perpendicular to the chip, the trace of which on the chip runs perpendicular to the direction of the grating lines (plane of FIG. 2). The reflected light thus remains in the same plane and produces a diffraction pattern on a screen E, which pattern is formed of light spots 10, 11, 11', 12, 12' distributed (FIG. 3) along the line Δ. The central spot 10 is produced by the ordinary reflection rays, whereas the spots on either side of it, the spots 11, 11', 12, 12' represent the secondary maxima of the diffraction pattern. Their distances from the spot 10 depend, among other things, on the above-mentioned transverse dimension p of the grating. Since the direction of the straight line depends upon the direction of the grating lines, the line Δ rotates around the center of the spot 10 when the chip is rotated in the plane of its face.

In a first embodiment of a method according to the invention, the laser beam L is alternately directed onto

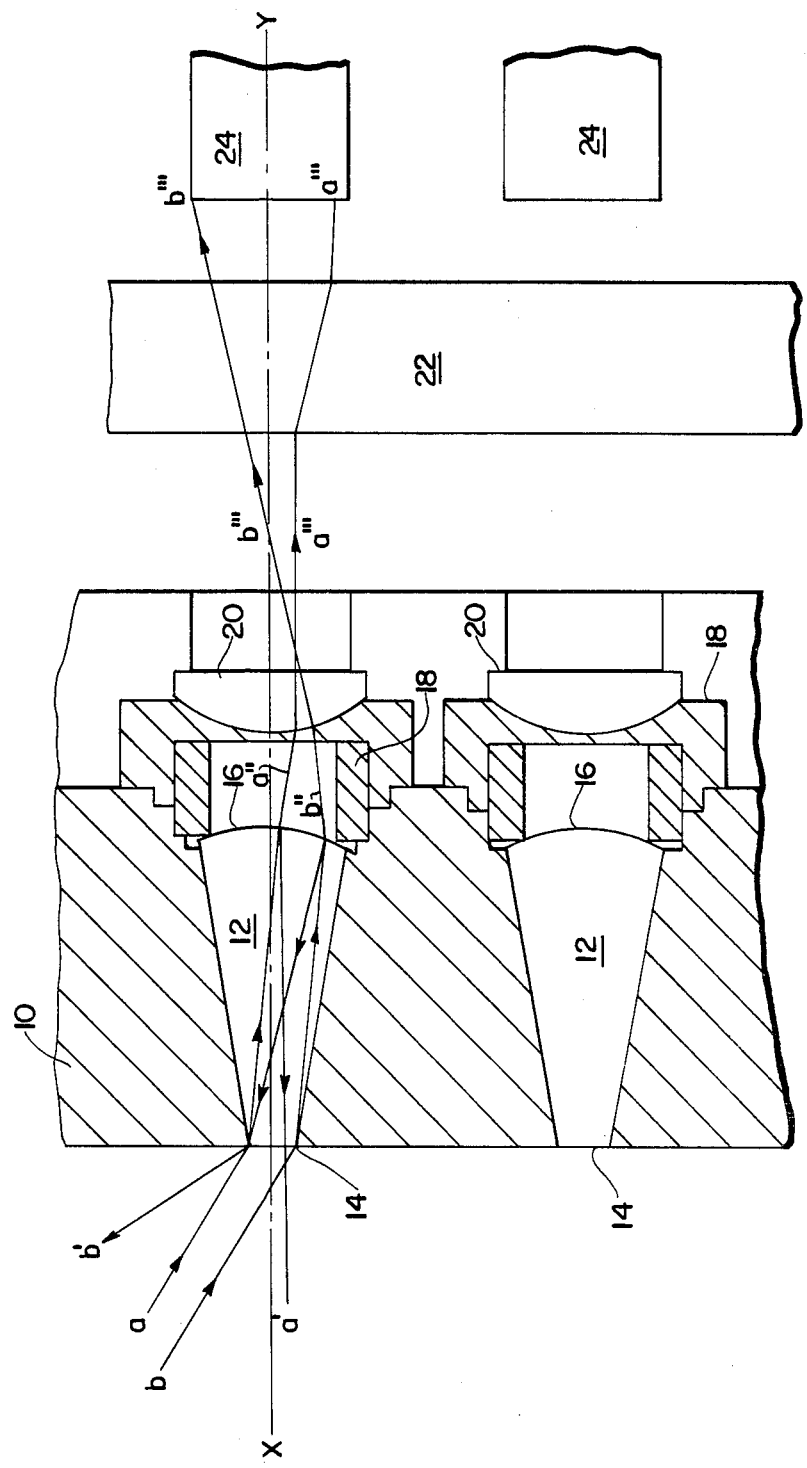

ELECTRO-OPTICAL DETECTOR PROTECTION DEVICE

BACKGROUND OF THE INVENTION

This invention relates to a field of optical apparatus and more particularly to apparatus for protecting an electro-optical detector used in a system for field diagnostic measurements of a continuous wave high energy laser beam.

Electro-optical detectors are generally operated in conjunction with primary optical systems for gathering and focusing the reflected radiation from a desired "target" or source, toward which the optical axis of the system is accordingly directed. In far field diagnostic measurements, a far field target is irradiated with a continuous high energy laser beam with a beam "on" time from 3-30 seconds. The intensity pattern in the far field is thereafter mapped using electro-optical detectors. However, the intensity of the target radiation is generally of a magnitude which, if unattenuated, can lead to detector failure or burnout.

SUMMARY OF THE INVENTION

Accordingly, one object of this invention is the provision of an apparatus for protecting electro-optical detectors from the high power irradiance of a laser beam.

Another object is the provision of an electro-optical detector protection device for use in far field diagnostic measurements of a high energy laser beam which allows large off-axis angles of the laser beam to be directed on a relatively small detector.

Briefly, these and other objects are attained by positioning a solid pin hole lens upstream of an electro-optical detector which is used in the far field diagnostic laser measurement. A silicon cone, having a truncated apex, acts as the pin hole aperture, and has a reflective surface defined by a radius drawn from the cone axis at the truncation. This surface has a reflective attenuator coating disposed thereon which serves to reflect most of the laser energy back out through the aperture thereby minimizing the absorption of the beam by the solid pinhole cone. The high refractive index of the solid silicon cone permits large off axis angles of an incident laser beam to be directed onto a detector. This factor increases the field of view of the electro-optical detection system for a given detector thereby obtaining high spatial resolution of the laser beam. A plurality of target detectors can be employed to cover the desired field of view.

BRIEF DESCRIPTION OF THE DRAWING

A more complete appreciation of the invention and many of the attendant advantages thereof will be readily appreciated as the same becomes better understood by reference to the following detailed description when considered in connection with the sole accompanying drawing wherein an optical schematic of the electro-optical detector protection device is given.

DESCRIPTION OF THE PREFERRED EMBODIMENT

Referring now to the drawing wherein a plurality of detector protection devices is shown positioned in a far field diagnostic measurement device housing 10. Fixed within housing 10 are a plurality of identical solid cones 12 disposed in a suitable array. Each cone 12 is truncated at its apex forming a pin hole aperture 14 and is constructed out of a material having a high index of refraction such as silicon. The large end of the cone has a surface 16 whose radius of curvature is centered at the truncation or at aperture 14. This surface is coated with a reflective attenuation coating, which in combination with the curvature of 16, ensures that most of the incident laser energy which enters through aperture 14 is reflected back out through the aperture. This arrangement thus minimizes the absorption of a laser beam a-b by the solid pin hole cone 12.

Contiguous to each cone 12 is a spacer 18 fixed within housing 10 which allows a field lens 20 to direct the laser beam through an attenuator such as lens 22 to a target unit or detector 24. The attenuator serves to absorb laser energy in order to further protect an associated detector. The target unit 24 can obviously be of many types of electro-optical devices but preferably may be a pyroelectric detector, each having its own protection device.

A plurality of target units may be employed in a suitable array to cover the desired field of view. The pyroelectric detectors could be sampled by switching from one detector to another using any conventional control system. The use of a pyroelectric detector for monitoring the laser beam irradiance is relatively conventional with each detector signal being sampled by an FET switch and commutated into a single preamp.

The present device not only reduces the possibility of detector destruction due to the incidence and measurement of a high energy laser beam such as a continuous wave laser beam but allows a relatively large off-axis angle of the incident laser beam to be directed onto a relatively small detector 24. This is accomplished by using the solid truncated cone having a high refractive index, as for example silicon.

As shown in the sole figure, an incident beam a-b enters pinhole aperture 14 at a large oblique angle to electro-optical detector and protection device axis x-y. After the beam a-b is refracted by the cone 12, most of the laser beam is reflected back out through aperture 14 as a'-b'. Some of the laser beam, is attenuated by the coating on surface 16 whereafter it, i.e., a"-b", freely passes through spacer 18. Field lens 20 further refracts the laser beam and directs the remittant beam a'''-b''' through attenuator 22 and onto the target detector 24. This arrangement prevents "cross-talk" between detectors so that a laser beam entering a particular pinhole aperture will arrive at its associated detector and not another random detector. Furthermore, since large off-axis angles of an incident laser beam can be directed onto a relatively small detector, the field of view of the system is increased for a given size detector. As a result, the detectors can be spaced physically closer together thereby achieving a higher spatial resolution of the laser beam.

Thus, what has been described is a electro-optical detector protection device utilizable in far field diagnostic measurements of a high energy laser beam which precludes destruction of the detector while allowing large-off axis angles of an incident laser beam to be directed onto a relatively small detector thereby increasing the field of view and spatial resolution of the system for a given sized detector.

Obviously, many modifications and variations of the present invention are possible in light of the above teachings. It is therefore to be expressly understood that within the scope of the appended claims the invention may be practiced otherwise than as specifically described.

What is claimed is:

1. An improved system for making far field diagnostic measurements of an incident laser beam comprising:
   a plurality of electro-optical detectors arranged in a suitable array;
   a plurality of electro-optical detector protection means, one protection means being associated with each detector:
      each protection means comprising means capable of optically transmitting and refracting said laser beam, said last mentioned means having means for reflecting most of the energy of said laser beam away from its associated detector and allowing a reduced energy level laser beam to be directed at its associated detector;
      means for focusing said reduced energy level laser beam on to its associated detector; and
      means disposed between said focusing means and the associated detector for further attenuating said reduced energy level laser beam before it impinges upon the associated detector.

2. An electro-optical detector protection device for use in a system for making far field diagnostic measurements of an incident high energy beam of light comprising:
   a solid cone capable of optically transmitting and refracting said incident beam of light, said cone having a truncated apex acting as a pinhole aperture, a surface of said cone having means disposed thereon for reflecting most of the energy of said incident beam of light back out through said aperture;
   means for directing the remainder of said incident beam of light onto an electro-optical detector; and
   means disposed between said last mentioned means and said detector for attenuating said incident beam of light before it impinges on said detector.

3. The device of claim 1 wherein said surface is defined on the large end of said cone by a radius drawn from the axis of said truncated cone at said pinhole aperture.

4. The device of claim 3 wherein said means disposed on said surface for reflecting most of the energy of said incident beam of light back through said aperture is a reflective attenuation coating.

5. The device of claim 4 wherein said means for directing the remainder of said incident beam of light comprises a field lens whose axis is coincident with the axis of said cone; and
   a spacer juxtaposed between said field lens and said surface, said spacer being contiguous to said surface.

6. The device of claim 5 wherein said attenuating means comprises an attenuating lens.

7. An improved system for making far field diagnostic measurements of an incident laser beam comprising:
   a plurality of electro-optical detectors arranged in a suitable array;
   a plurality of electro-optical detector protection means, one protection means being associated with each detector:
   each protection means comprising means capable of optically transmitting and refracting said laser beam, said last mentioned means having means for reflecting most of the energy of said laser beam away from its associated detector and allowing a reduced energy level laser beam to be directed at its associated detector;
   means for focusing said reduced energy level laser beam on to its associated detector; and
   means disposed between said focusing means and the associated detector for further attenuating said reduced energy level laser beam before it impinges upon the associated detector;
   wherein said means capable of optically transmitting and refracting said laser beam comprises a solid cone having a truncated apex acting as a pinhole aperture, said cone having a surface for directing most of the energy of said incident laser beam back out through said aperture.

8. The system of claim 7 wherein said surface is defined on the large end of said cone by a radius drawn at the longitudinal axis of said cone from said aperture.

9. The system of claim 7 wherein the material of said cone is silicon.

10. The system of claim 7 wherein said surface has a reflection attenuating coating disposed thereon.

11. The system of claim 8 wherein said focusing means comprises a field lens whose axis is coincident with the axis of said cone; and
    a spacer juxtaposed between said field lens and said surface, said spacer being contiguous to said surface.

12. The system of claim 11 wherein said attenuating means comprises an attenuating lens.

* * * * *